(12) United States Patent
Tiberghien et al.

(10) Patent No.: US 8,397,754 B2
(45) Date of Patent: Mar. 19, 2013

(54) COUPLING ELEMENT WITH A SHUTTER VALVE, AND A COUPLING INCORPORATING SUCH AN ELEMENT

(75) Inventors: Alain-Christophe Tiberghien, Sevrier (FR); Christophe Durieux, Gilly sur Isere (FR)

(73) Assignee: Staubli Faverges, Faverges (FR)

( * ) Notice: Subject to any disclaimer, the term of this patent is extended or adjusted under 35 U.S.C. 154(b) by 709 days.

(21) Appl. No.: 12/449,549

(22) PCT Filed: Feb. 21, 2008

(86) PCT No.: PCT/FR2008/000227
§ 371 (c)(1),
(2), (4) Date: Aug. 13, 2009

(87) PCT Pub. No.: WO2008/122712
PCT Pub. Date: Oct. 16, 2008

(65) Prior Publication Data
US 2010/0013218 A1    Jan. 21, 2010

(30) Foreign Application Priority Data
Feb. 22, 2007 (FR) ...................................... 07 01273

(51) Int. Cl.
*F16L 29/00* (2006.01)
(52) U.S. Cl. ............ 137/614.03; 137/614.04; 251/149.6
(58) Field of Classification Search ......... 137/614.03–614.05, 614; 251/149.1, 251/149.6
See application file for complete search history.

(56) References Cited

U.S. PATENT DOCUMENTS

| 2,456,045 A | * | 12/1948 | Brock ...................... 137/614.03 |
| 2,854,259 A | | 9/1958 | Clark |
| 6,161,578 A | | 12/2000 | Braun et al. |
| 7,147,003 B2 | * | 12/2006 | Maldavs .................. 137/614.04 |

FOREIGN PATENT DOCUMENTS

| EP | 0 477 949 A | 4/1992 |
| FR | 2 409 445 | 6/1979 |

* cited by examiner

*Primary Examiner* — Kevin Lee
(74) *Attorney, Agent, or Firm* — Dowell & Dowell, PC (57) ABSTRACT

The invention concerns the female or male member (3) of a connection (1) that can be connected with a corresponding male or female connection member (5) and includes a pusher (33) and a stop valve (35) capable of sliding axially relative to the pusher (33) for coupling to the member (3). The member (3) further includes at least one seal (34) mounted on a first part (35) selected from the pusher and the valve and capable of sealing interaction with a first portion (331) of the second part (33) selected from the pusher and the valve in an uncoupled configuration of the member (3). In the coupled configuration of the member (3), a second portion (333) of the second part (33), defining a seal (34) protection portion (333), is radially provided between the seal (34) and a main fluid flow line (V) in the member (3). The portions (331, 333) have different radial dimensions so that the radial thickness available for the seal (34) in the coupled configuration is higher than the radial configuration available for the seal (34) in the uncoupled configuration. The portions (331, 333) are connected to each other by connection tabs (338) having a constant cross-section.

14 Claims, 8 Drawing Sheets

COUPLING ELEMENT WITH A SHUTTER VALVE, AND A COUPLING INCORPORATING SUCH AN ELEMENT

BACKGROUND OF THE INVENTION

1. Field of the Invention

The present invention relates to a coupling element for providing a releasable connection between pipes that convey a fluid under pressure, this element including a pusher and a shutter valve suitable for sliding axially relative to the pusher when coupling the element with a corresponding coupling element. The invention also relates to a coupling incorporating such an element.

2. Description of Related Art

In the field of hydraulic couplings having pushers and shutter valves, it is known to provide sealing for a coupling element when said element is in an uncoupled configuration by means of an O-ring housed at the interface between the pusher and the valve. While the element is being coupled with a corresponding element, the sliding of the valve relative to the pusher positions the sealing O-ring in contact with the fluid flow section in the coupling. With high fluid flow rates, there is therefore a risk of the sealing O-ring being expelled from its housing when the coupling is in the coupled configuration, which can give rise to sealing problems on uncoupling.

EP-A-0 477 949 describes a coupling with pushers and shutter valves in which, in the coupled configuration of the coupling, some of the O-rings that provide sealing between the pushers and the valves in the uncoupled configuration are protected from the fluid flow section by the pusher of one of the elements of the coupling. The above-mentioned O-rings are also used for providing sealing of the coupling in the coupled configuration. For this purpose, those O-rings are designed to be in contact with the pusher that protects them from the fluid flow section in the coupled configuration of the coupling, such that in the event of relative micromovements between the elements of the coupled-together coupling, there is friction at the interface between said O-rings and the protective pusher. Such relative micromovements can occur in particular when the elements of the coupling are locked together not by means of balls, as described in EP-A-0 477 949, but by means of plates carrying multiple connections. The elements of the coupling are then not prevented from moving axially by being in abutment one against the other so as to avoid impeding locking the plates together, so the elements can move towards each other and away from each other axially if, for example, some of the connections carried by the plates are subjected to vibration or convey fluids at different temperatures. The resulting friction at the interface between the O-rings and the protective pusher give rise to deterioration in the quality of the sealing and the lifetime of the O-rings.

U.S. Pat. No. 2,854,259 also describes a coupling having pushers and shutter valves in which, when the coupling is in its coupled configuration, O-rings that provide sealing between the pushers and the valves in the uncoupled configuration are protected from the fluid flow by the pusher of one of the elements of the coupling. While coupling and uncoupling the elements of the coupling, the above-mentioned O-rings are caused to move axially relative to the outer peripheral surface of the protective pusher. The protective pusher is provided with an outside diameter that is smaller than the inside diameter of the O-rings when they are in their rest configuration. Nevertheless, the protective pusher includes orifices in its peripheral surface that are designed to pass a flow of fluid through the coupling in the coupled-together configuration, and at said openings the O-rings are liable to be deformed under the effect of the fluid pressure. In particular, the O-rings are liable to be brought into contact with the edges of the orifices while the elements of the coupling are being coupled together. This gives rise to high levels of friction being exerted on the O-rings each time they go past the orifices in the protective pusher, and thus to premature wear of the O-rings and to deterioration in the quality of sealing.

SUMMARY OF THE INVENTION

The invention seeks more particularly to remedy those drawbacks by proposing a coupling element having a pusher and a shutter valve and including at least one O-ring suitable for providing sealing for the element in the uncoupled configuration, said element also guaranteeing good stability for said O-ring when the element is in the coupled configuration, without deteriorating the effectiveness or the lifetime of the O-ring.

To this end, the invention provides a female or male coupling element for a coupling for releasably connecting together pipes conveying a fluid under pressure, said female or male element being suitable for being coupled with a corresponding male or female coupling element, said female or male element including a pusher and a shutter valve suitable for sliding axially relative to the pusher during coupling of said element, said female or male element further including at least one sealing O-ring received in a peripheral groove of a first part selected from the pusher and the valve and suitable for co-operating in leaktight manner with a first portion of a second part selected from the pusher and the valve in the uncoupled configuration of said element, whereas, in the coupled configuration of said element, a protection part for protecting the O-ring and forming a portion of said element is radially interposed between the O-ring and a main fluid flow in said element, the protection part being a second portion of the second part, the first and second portions of the second part having radial dimensions that are different, and the radial thickness available for the O-ring in the coupled configuration of said element being greater than the radial thickness available for the O-ring in the uncoupled configuration of said element, the first and second portions of the second part being connected to each other by connection tabs, and the element being characterized in that each connection tab is of cross-section that is constant along its entire length.

According to other characteristics of a coupling element in accordance with the invention that are advantageous:
- a diameter of the O-ring housed in a peripheral groove of the part on which it is mounted, and a diameter of the protection part are such that the O-ring is not in contact with the protection part in the coupled configuration of said element;
- the portion of the second part defined by the connection tabs is at least partially of radial dimensions that are equal to those of the second portion;
- the second part has three connection tabs regularly distributed around the periphery of the second part;
- the O-ring is received in an inner peripheral groove of the valve and co-operates in leaktight manner with an outer peripheral surface of a solid portion of the pusher in the uncoupled configuration of said element, the protection part being a hollow portion of the pusher, the solid and hollow portions of the pusher being connected together by the connection tabs, the solid portion being of radial dimensions greater than the radial dimensions of the hollow portion;
- the solid portion of the pusher includes a conical end disposed in a main fluid flow channel in said element;

the second part includes, in said first portion, at least one orifice opening out radially in a position that lies, along the longitudinal axis of said element between the front end of the second part and the front end of the connection tabs;

each orifice of the second part opens out in a portion of the second part that is of radial dimensions equal to the radial dimensions of the second portion of the second part;

each orifice of the second part has a cross-section greater than the cross-section of a radial gap defined between the second part and a part adjacent to the second part during coupling of said element with a corresponding coupling element;

the element includes another sealing O-ring that is stationary relative to a body of said element and that is designed to provide sealing for the coupling obtained by coupling said element with a corresponding coupling element;

the front face of the element defined by the front faces of the pusher and of the valve in the uncoupled configuration of the element is substantially plane.

The invention also provides a coupling for releasably connecting pipes conveying a fluid under pressure, the coupling comprising a female element and a male element suitable for being coupled together, the coupling being characterized in that at least one of the coupling elements is an element as described above.

According to other characteristics of a coupling in accordance with the invention, that are advantageous:

the second element of the coupling includes a pusher and a shutter valve suitable for sliding axially relative to the pusher for coupling the two elements of the coupling together, the second element further including at least one sealing O-ring mounted on one part selected from the pusher and the valve of the second element and suitable for providing sealing between the pusher and the valve in the uncoupled configuration of the second element, the protection part of the first element being interposed radially in the coupled configuration of the coupling between the O-ring of the second element and a main fluid flow section in the coupling, the radial thickness available for the O-ring of the second element in the coupled configuration of the coupling being greater than the radial thickness available for the O-ring of the second element in the uncoupled configuration of the second element;

the pusher of the first element is suitable for co-operating with the valve of the second element, and the pusher of the second element is suitable for co-operating with the valve of the first element for coupling together the two elements of the coupling;

the axial distance between a rear end of a groove for receiving the O-ring of the second element and a rear end of a shutter portion of the part of the second element on which the O-ring is mounted is greater than or equal to the axial distance between the first and second portions of the part of the first element forming the protection part; and each element of the coupling is secured to a plate, the coupling being suitable for being locked in the coupled configuration by securing together the plates of the two elements.

BRIEF DESCRIPTION OF THE DRAWINGS

The characteristics and advantages of the invention appear in the following description of three embodiments of a coupling element and a coupling of the invention, given solely by way of example and made with reference to the accompanying drawings, in which.

DETAILED DESCRIPTION OF THE INVENTION

Figure 1:
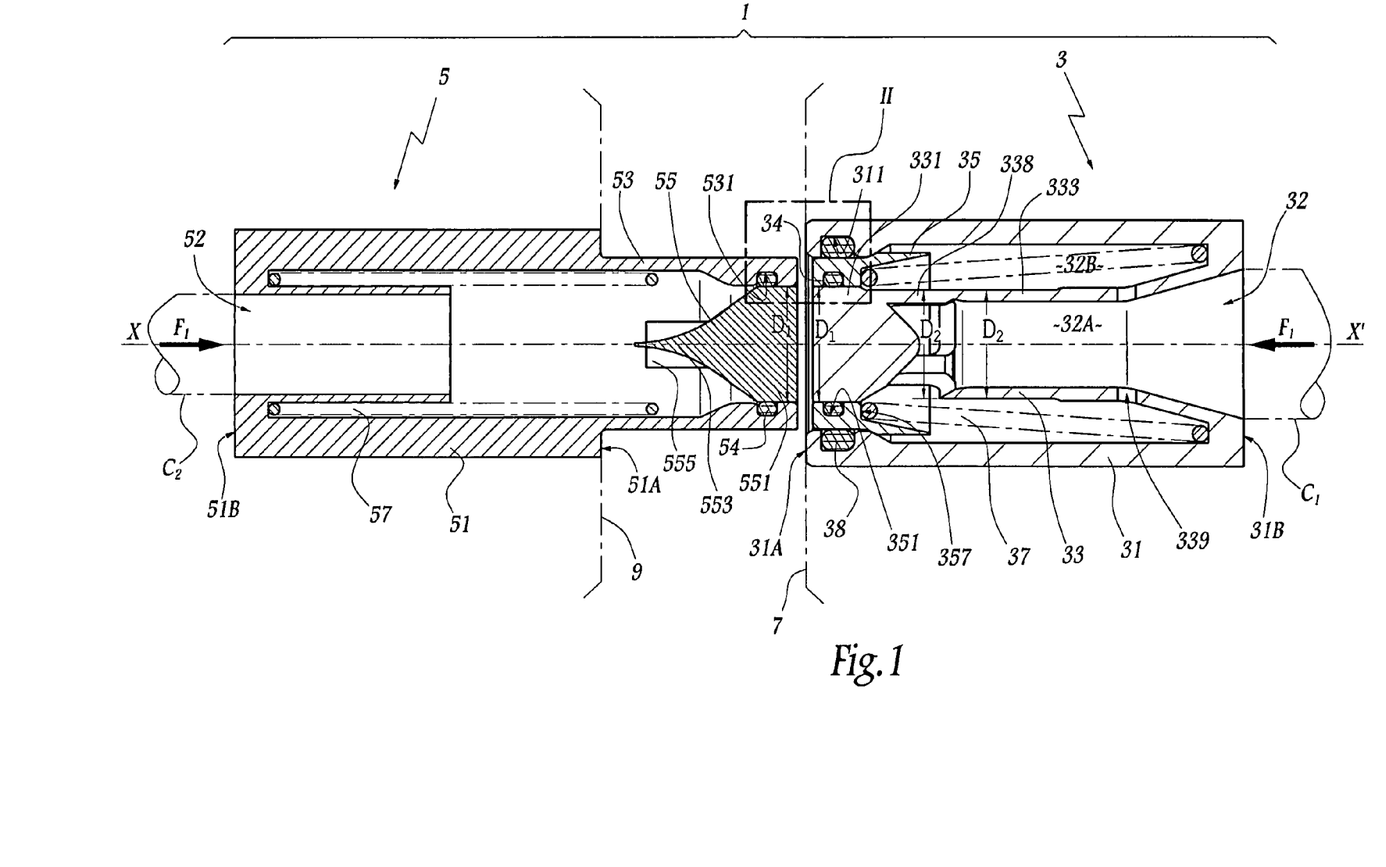
FIG. 1 is a longitudinal section of a coupling constituting a first embodiment of the invention, with its male and female elements being in a decoupled configuration.
Figure 2:
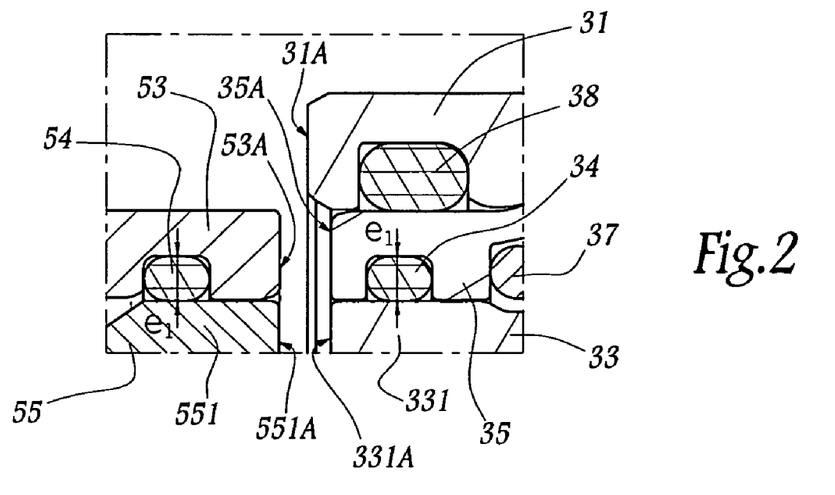
FIG. 2 is a view on a larger scale of detail II of FIG. 1.
Figure 3:
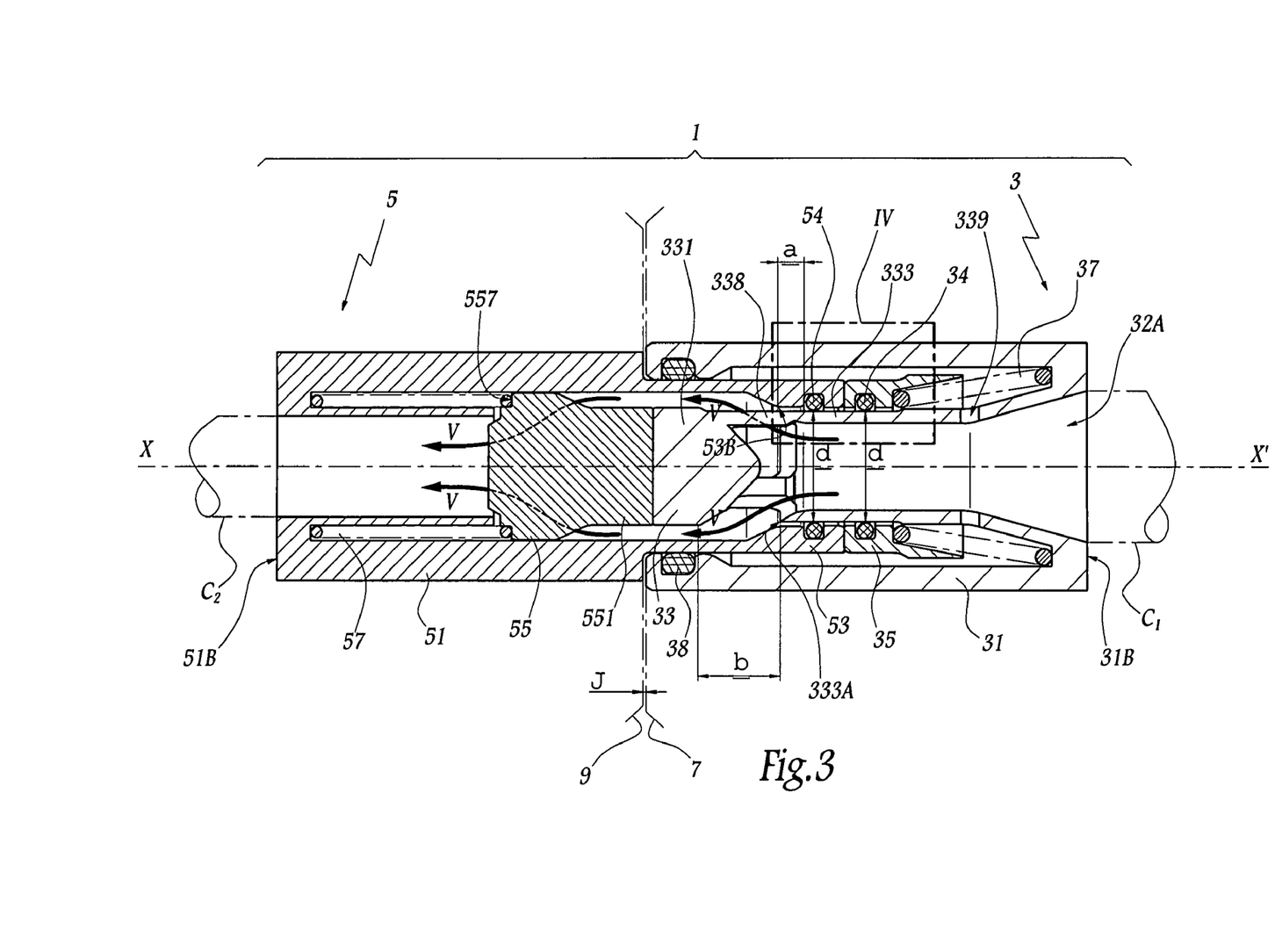
FIG. 3 is a longitudinal section view of the FIG. 1 coupling on a plane perpendicular to the section plane of FIG. 1, with the male and female elements shown in the coupled configuration.
Figure 4:
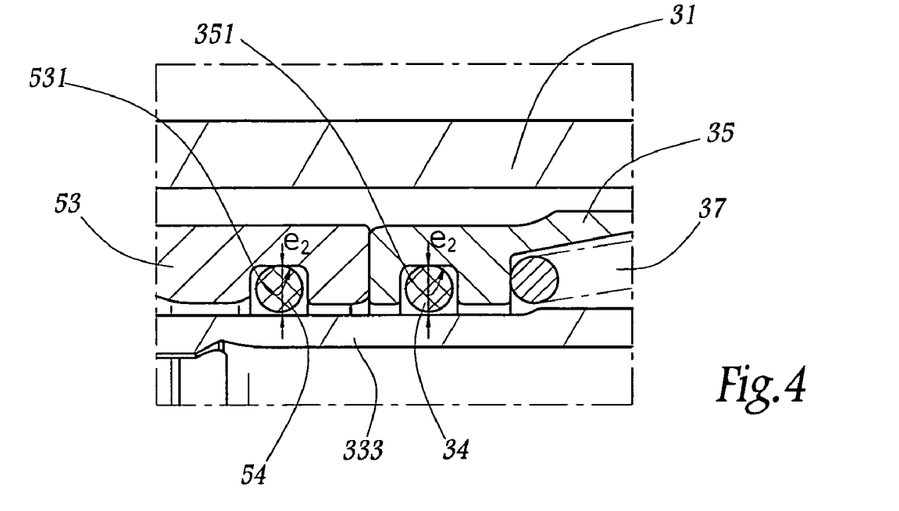
FIG. 4 is a view on a larger scale of detail IV of FIG. 3.

The coupling 1 shown in FIGS. 1 and 3 comprises a female element 3 and a male element 5 designed to engage one in the other along the direction of an engagement axis X-X', which is a longitudinal axis common to the elements 3 and 5. In the meaning of the invention, the "front" of an element 3 or 5 designates the portion of that element that is designed to be directed towards the other element to obtain engagement, the "rear" of the element being its opposite portion. By extension the "front" of a component part of the element 3 or 5 designates the portion of said part that is directed towards the front of the element.

The female element 3 comprises a tubular body 31 of circular section that defines an inside volume 32 that is open at both the front and the rear ends 31A and 31B of the body 31. An upstream pipe $C_1$ is connected to the inside volume 32 via the rear end 31B of the body 31, and a pusher 33, secured to the body 31, is placed in the inside volume 32. Within the inside volume 32 of the body 31, the pusher 33 defines a main fluid flow channel 32A, inside the pusher, and an annular volume 32B outside the pusher. In FIGS. 1 and 3, the pusher 33 is shown as being integral with the body 31. Nevertheless, these portions of the element 3 could be made as two distinct parts that are subsequently assembled together.

Figure 5:
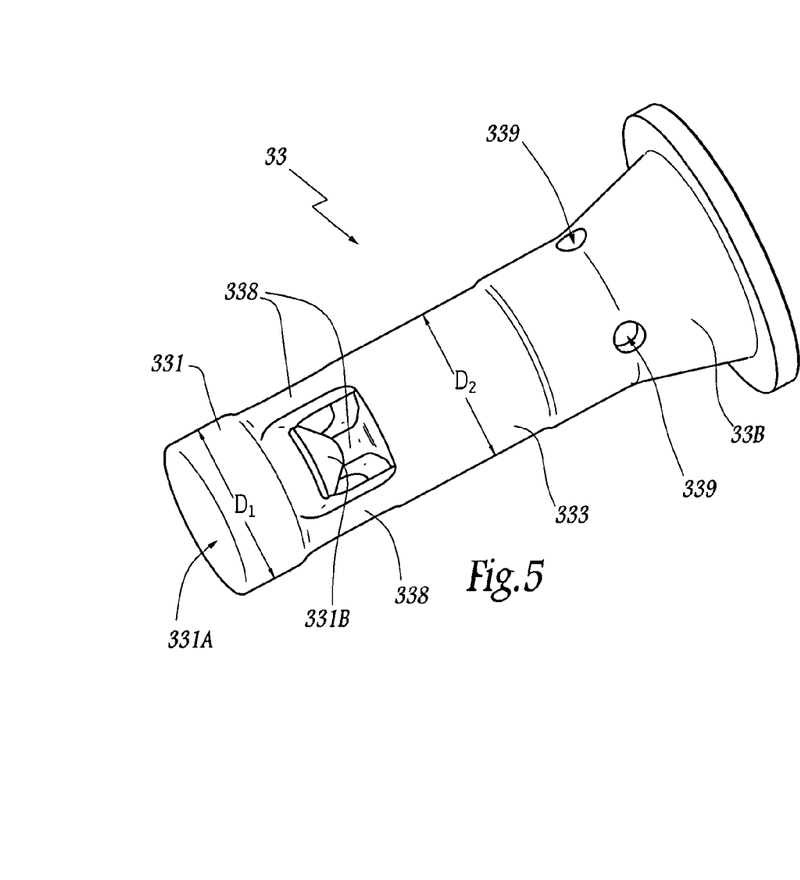
FIG. 5 is a perspective view on a larger scale of the pusher of the female element of the FIG. 1 coupling.

The pusher 33 has a solid portion 331 and a hollow portion 333 interconnected by three connection tabs 338 that are regularly distributed around the outer periphery of the pusher 33. The solid portion 331 is of circular section and defines a substantially plane front face 331A of the pusher. As can be seen in FIG. 5, a rear end 331B of the solid portion 331 that projects into the volume defined by the tabs 338 is of conical shape, flaring towards the front face 331A of the pusher 33. Such a conical shape for the solid portion 331 located within the main fluid flow channel 32A when the coupling 1 is in its coupled configuration serves to facilitate the flow of fluid, in particular at high fluid flow rates.

The hollow portion 333 of the female pusher 33 is tubular and of circular section. The female pusher 33 has vents 339 pierced through a peripheral wall of the rear end 33B of the pusher, behind the hollow portion 333.

The outside diameter $D_1$ of the solid portion 331 is greater than the outside diameter $D_2$ of the hollow portion 333. The connection tabs 338 between the portions 331 and 333 define a cylindrical envelope having the same outside diameter $D_2$ as the hollow portion 333. Each tab 338, extending substantially parallel to the axis X-X', is obtained by milling and presents a cross-section that is constant over its entire length. Such tabs 338 of constant section limit disturbances to the fluid flow.

The female element 3 also includes a tubular valve 35 of circular section that is located in the annular volume 32B defined between the pusher 33 and the body 31. The valve 35 is movable in translation relative to the body 31 and to the pusher 33 parallel to the axis X-X'. A spring 37 exerts a resilient force on an internal shoulder 357 of the valve 35 such that a substantially plane front face 35A of the valve 35 is substantially flush with the front face 331A of the pusher 33 in the decoupled configuration of the element 3. The front face of the female element 3, defined by the front faces 331A of the pusher 33 and 35A of the valve 35 is then substantially plane. The valve 35 is provided with an inner peripheral groove 351 for receiving an O-ring 34 that is suitable for providing sealing between the pusher 33 and the valve 35 in a decoupled configuration of the female element 3.

In the vicinity of the front end 31A, the body 31 of the female element 3 includes an inner peripheral groove 311 for receiving another O-ring 38 designed to provide sealing between the body 31 and the valve 35 in the decoupled configuration of the female element 3. Thus, the combination of the O-rings 34 and 38 guarantees that the female element 3 is sealed in the decoupled configuration.

The male element 5 comprises a tubular body 51 of circular section that defines an inside volume 52 open at both the front and the rear ends 51A and 51B of the body 51. A downstream pipe $C_2$ is connected to the inside volume 52 via the rear end 51B of the body 51. At its front end 51A, the body 51 is extended by a pusher 53 that is likewise tubular. As shown in FIGS. 1 and 3, the pusher 53 is formed integrally with the body 51. Nevertheless, these portions could be made as two distinct parts that are assembled together.

Figure 6:
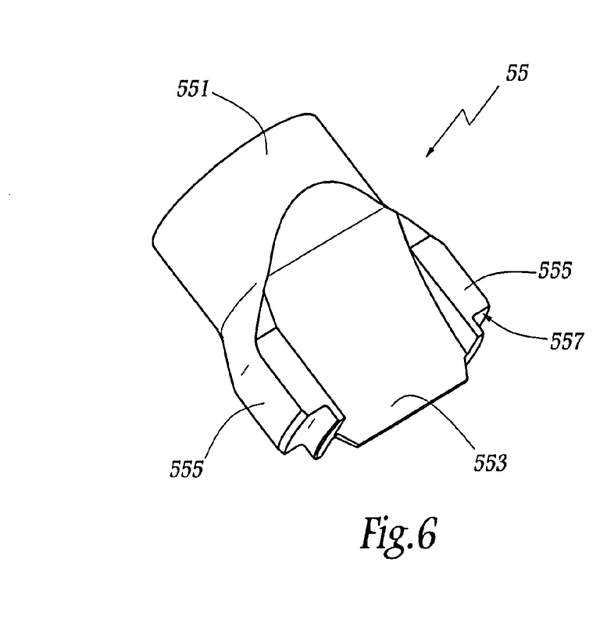
FIG. 6 is a perspective view on a larger scale of the shutter valve for shutting the male element of the FIG. 1 coupling.

The male element 5 includes a valve 55 disposed in the inside volume 52 and movable in translation relative to the body 51 and to the pusher 53 parallel to the axis X-X'. The valve 55 is solid and includes a cylindrical front portion 551 of circular section that defines a substantially plane front face 551A of the valve 55, and a rear portion 553 that is flattened in a radial dimension of the valve 55. As can be seen in FIG. 6, the valve 55 comprises on either side of the rear portion 553, two guide prongs 555 for co-operating with inside surfaces of the body 51 and of the pusher 53 to center the valve 55 on the axis X-X' when it moves relative to the portions 51 and 55.

A spring 57 exerts a resilient force on an external shoulder 557 of each prong 555 so that the front face 551A of the valve 55 is substantially flush with a substantially front face 53A of the pusher 53 when the element 5 in the decoupled configuration. The front face of the male element 5, defined by the front faces 53A, 551A of the pusher 53 and of the valve 55 is then substantially plane. The pusher 5 is provided with an inner peripheral groove 531 for receiving an O-ring 54 suitable for providing sealing between the pusher 53 and the valve 55 in the decoupled configuration of the male element 5.

In this embodiment, the front portion 551 of the male valve 55 has the same outside diameter $D_1$ as the solid portion 331 of the female pusher 33. Furthermore, the inside diameter d of the O-rings 34 and 54 that are housed respectively in the grooves 351 and 531 is greater than the outside diameter $D_2$ of the hollow portion 333 of the female pusher 33. Advantageously, the inside diameter d of the O-rings 34 and 54 is equal to or slightly smaller than the outside diameter $D_1$ of the portion 331 of the female pusher 33 and of the portion 551 of the male valve 55.

The body 31 of the female element 3 is secured to a first multiple connection plate 7 shown partially in chain-dotted lines in FIGS. 1 and 3 and carrying a plurality of male or female coupling elements. Furthermore, the body 51 of the male element 5 is secured to a second multiple connection plate 9, likewise drawn in chain-dotted lines in FIGS. 1 and 3, and carrying coupling elements complementary to those carried by the plate 7.

When it is appropriate to couple the elements 3 and 5 of the coupling 1 together, they are moved towards each other, as represented by arrows $F_1$ in FIG. 1, so as to cause the male element 5 to engage in the female element 3. The front face 331A of the female pusher 33 comes into contact with the front face 551A of the male valve 55, such that the male valve 55, which is movable in translation parallel to the axis X-X' inside the male pusher 53 and the male body 51, is pushed back axially towards the rear end 51B of the body 51 against the spring 57. Simultaneously, the front face 53A of the male pusher 53 comes into contact with the front face 35A of the female valve 35, and since the female valve 35 is movable in translation parallel to the axis X-X' inside the female body 31, it is pushed back axially towards the rear end 31B of the body 31 against the spring 37.

While the male and female elements 3 and 5 are being coupled together, the O-rings 34 and 54 received respectively in the grooves 351 and 531 move along the outer peripheral surface of the female pusher 33. More specifically, each O-ring 34 or 54 moves successively in register with the outer peripheral surface of the solid portion 331 of the pusher 33 and then in register with the coupling portion defined by the tabs 338 until it comes into register with the outer peripheral surface of the hollow portion 333 of the pusher 33 when the female and male elements 3 and 5 are in the coupled configuration. In the coupled configuration of the coupling 1, the O-ring 38 housed in the female body 31 provides sealing for the coupling between the elements 3 and 5 by co-operating in leaktight manner with the outer peripheral surface of the male pusher 53.

The vents 339 formed behind the hollow portion 333 of the female pusher 33 serve to ensure that pressure inside the female element 3 does not rise excessively while coupling is taking place. Such an increase in pressure would be the result of a decrease in the volume available for the fluid behind the female element 3 as the valve 35 and the pusher 53 move towards the rear of said element, the assembly formed by the elements 3 and 5 during coupling also being sealed by the O-ring 38 at the interface between the female body 31 and the male pusher 53. Because of the vents 339, the effort that needs to be delivered in order to couple the female and male elements 3 and 5 together is unaffected by the movement of the valve 35 and of the pusher 53 inside the female body 31.

In the coupled configuration of the coupling 1, the front face 31A of the female body 31 is located close to a shoulder defining the front face 51A of the male body 51. The plates 7 and 9 that are secured respectively to the element 3 and to the element 5 can then themselves be secured to each other by means that are not shown so as to lock the coupling 1 with its elements in the coupled configuration. A clearance J is maintained between the ends 31A and 51A so as to avoid impeding interconnection between the plates 7 and 9.

In the coupled configuration shown in FIG. 3, the O-rings 34 and 54 are in contact with the fluid, but they are protected from the main fluid flow V through the coupling 1, i.e. they are protected from the fluid flow at a high rate, by the hollow portion 333 of the female pusher 33. More specifically, the hollow portion 333 provides the O-rings 34 and 54 with radial protection relative to the main flow V since it is radially interposed between these O-rings and the main channel 32A for fluid flow. The hollow portion 333 also provides axial protection to the O-rings 34 and 54 relative to the main flow V, since these O-rings are set back from the front end 333A of the hollow portion 333 and from fluid flow orifices defined between each pair of coupling tabs 338 between the solid portion 331 and the hollow portion 333. Under such circumstances, the fluid reaches the O-rings 34 and 54 through a passage of dimensions that are much smaller than those of the main fluid flow channel 32A and of the flow orifices, such that the force exerted by the fluid on the O-rings 34 and 54 is greatly reduced. This serves to minimize any risk of the O-rings 34 and 54 being expelled from their respective grooves 351 and 531, thereby increasing the reliability with which the coupling 1 is sealed.

Because of the difference between the outside diameters $D_1$ and $D_2$ between firstly the hollow portion 333 of the female pusher 33 and secondly the portions 331 and 551, the radial thickness $e_2$ available for the O-rings 34 and 54 between the bottoms of their respective receiver grooves 351 and 531 and the outer peripheral surface of the hollow portion 333, in the coupled configuration of the elements 3 and 5 of the coupling 1, is greater than the radial thickness $e_1$ available for the O-rings 34 and 54 in the decoupled configuration of each of the elements 3 and 5. Thus, during coupling of the elements 3 and 5 and in the coupled configuration of these elements, the O-rings 34 and 54 are subjected to stretching that is significantly reduced compared with the stretching to which they are subjected in the decoupled configuration of each of the elements 3 and 5. In particular, in this embodiment, the outside diameter $D_2$ of the hollow portion 333 of the female pusher 33 is selected to be a few tenths of a millimeter, specifically 0.25 mm in the example shown, less than the inside diameter d of the O-rings 34 and 54, such that the O-rings 34 and 54 are confined in the receiver grooves 351 and 531 by the hollow portion 333, serving to limit the amount they can move radially out from the grooves, while not being subjected to any friction or stretching by the hollow portion 333, which protects them from the main fluid flow section V in the coupled-together configuration of the elements 3 and 5. As a result, in the event of relative micromovements between the elements 3 and 5 that are locked together by means of the plates 7 and 9, the stresses to which the O-rings 34 and 54 are subjected are minimized, with the O-rings then not being weakened by their own stretching.

In the meaning of the invention, the radial thickness that is "available" for an O-ring is the mean radial thickness available for said O-ring. In the coupled configuration of the coupling 1, the female valve 35 need not be centered around the hollow portion 333 of the female pusher 33. The valve 35 is floatingly mounted in the body 31 and it is guided solely by the spring 37. As a result, the radial thickness $e_2$ that is available for the O-ring 34 in the coupled configuration may vary around the periphery of the O-ring 34. In particular, the radial thickness $e_2$ may locally be substantially equal to, or even less, than the radial thickness $e_1$ available in the uncoupled configuration of the female element 3. Nevertheless, the mean radial thickness $e_2$ remains greater than the radial thickness $e_1$, thereby guaranteeing that the O-ring 34 is subjected to less stress in the coupled-together configuration than in the uncoupled configuration.

Selecting the diameter $D_2$ to be less than the diameter d implies that the O-rings 34 and 54, housed respectively in the grooves 351 and 531, are not in contact with the outer peripheral surface of the hollow portion 333 when the coupling 1 is in the coupled configuration. The absence of contact between the O-ring 34 and the peripheral surface of the portion 333 is total when the female valve 35 and the O-ring 34 are centered around the hollow portion 333. Such an arrangement is possible because of the presence of the O-ring 38 that provides sealing for the coupling 1 in the coupled-together configuration. The O-rings 34 and 54, which do not provide sealing for the coupling 1 in the coupled-together configuration, are thus subjected to no additional deformation or rubbing while the elements 3 and 5 are being coupled together, unlike the O-rings in the coupling described in EP-A-0 477 949. This serves to preserve the lifetime of the O-rings 34 and 54. The presence of the O-ring 38 also serves to reduce the axial size of the coupling 1 in accordance with the invention compared with a coupling of the construction as described in EP-A-0 477 949.

In this embodiment, and as shown in FIGS. 1 and 3, the circuit is opened during coupling of the elements 3 and 5 before the O-rings 34 and 54 are protected from the main fluid flow V by the hollow portion 333 of the female pusher 33. The connection tabs 338 between the solid and hollow portions 331 and 333 of the female pusher 33, which face the O-ring 34 and 54 when the circuit opens, guarantee local confinement of the O-rings 34 and 54 in their respective receiver grooves 351 and 531, and serve to prevent the O-rings 34 and 54 being expelled from said grooves.

In a variant of the invention that is not shown, the tabs 338 may be arranged in such a manner that the coupling portions they define on the female pusher 33 present, at least in part, an outside diameter that is equal to the outside diameter $D_1$ of the solid portion 331 of the female pusher 33. Such a profile for the tabs 338 improves the confinement of the O-rings 34 and 54 in their respective grooves 351 and 531 during the transient stage of coupling the elements 3 and 5 together, but it gives rise to additional friction being exerted on the O-rings 34 and 54.

In another variant of the invention that is not shown, the female and male elements 3 and 5 of the coupling 1 may be designed in such a manner that, while coupling is taking place, the fluid does not begin to flow through the coupling 1 until the O-rings 34 and 54 are radially protected from the main flow V by the hollow portion 333 of the female pusher 33. Provision must then be made for the axial distance a, as measured between the rear end of the groove 531 for receiving the O-ring 54 and the rear end 53B of the shutter portion of the male pusher 53, i.e. the portion of the pusher 53 that is suitable for co-operating with the outer peripheral surface of the solid portion 331 of the female pusher 33, is greater than or equal to the axial distance b, as measured between the solid and hollow portions 331 and 333 of the female pusher 33, i.e. between the zone where the tabs 338 join the solid portion 331 and the front end 333A of the hollow portion 333.

Figure 7:
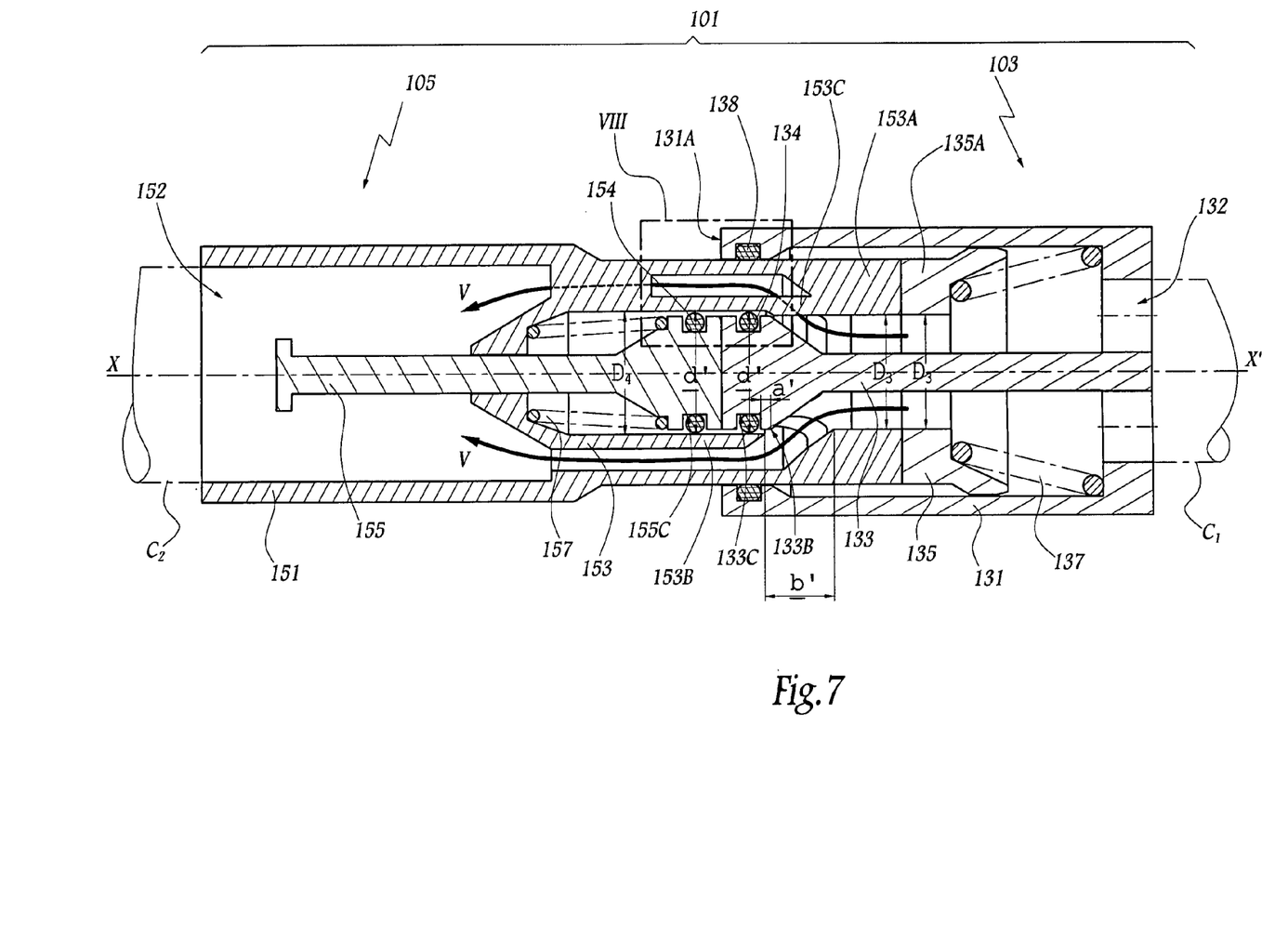
FIG. 7 is a section analogous to FIG. 3 for a coupling according to a second embodiment of the invention.
Figure 8:
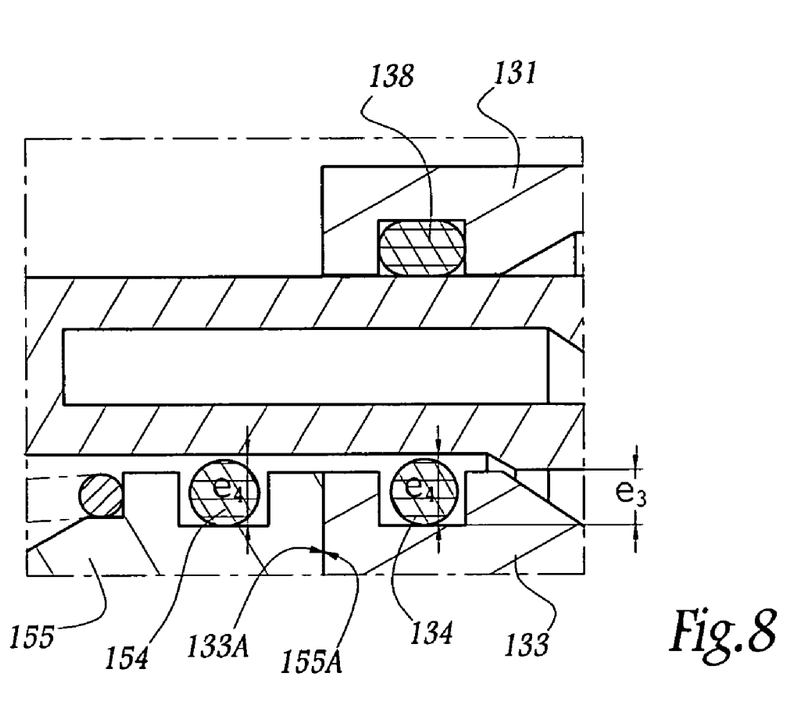
FIG. 8 is a view on a larger scale of detail VIII of FIG. 7.

In the second embodiment as shown in FIG. 7, elements that are analogous to the first embodiment are given identical references plus 100. The coupling 101 in this second embodiment comprises a female element 103 and a male element 105 designed to engage one in the other in the direction of a common longitudinal axis X-X' of the elements 103 and 105.

The female element 103 comprises a tubular body 131 of circular section, with the rear thereof being connected to an upstream pipe $C_1$. A pusher 133 that is secured to the body 131 is located in an inside volume 132 of the body 131. In FIG. 7, the pusher 133 is shown as being integral with the body 131. Nevertheless, these portions could be constituted by two distinct parts that are assembled together.

The female element 103 also includes a tubular valve 135 of circular section located in the inside volume 132 around the pusher 133 and movable in translation parallel to the axis X-X' and relative to the body 131 and to the pusher 133. The valve 135 is resiliently biased by a spring 137 so that, in the uncoupled configuration of the female element 103, a plane front face of a front portion 135A of the valve 135 is substantially flush with a plane front face 133A of the pusher 133.

In this second embodiment, sealing between the pusher 133 and the valve 135 in the uncoupled configuration of the female element 103 is provided by an O-ring 134 housed in an outer peripheral groove 133C of the pusher 133. The body 131 also includes, in analogous manner to the first embodiment, an inner peripheral groove located in the vicinity of the front end 131A of the body 131 and receiving another O-ring 138 suitable for providing sealing between the body 131 and the valve 135 in the uncoupled configuration of the female element 103.

The male element 105 comprises a tubular body 151 of circular section, with the rear thereof being connected to a downstream pipe $C_2$ and with its front end extended by a pusher 153. As shown in FIG. 7, the pusher 153 is integral with the body 151. Nevertheless, these portions could be constituted by two distinct parts that are assembled together.

The male element 105 also has a valve 155 disposed in the inside volume 152 of the body 151 and movable in translation parallel to the axis X-X' relative to the body 151 and to the pusher 153. The valve 155 is resiliently biased by a spring 157 such that, in the uncoupled configuration of the male element 105, a plane front face 155A of the valve 155 is substantially flush with a plane front face of the front portion 153A of the pusher 153. An O-ring 154 suitable for providing sealing between the pusher 153 and the valve 155 in the uncoupled configuration of the male element 105 is housed in an outer peripheral groove 155C of the valve 155.

The pusher 153 comprises a solid front portion 153A and a hollow rear portion 153B that are connected together by three connection tabs 153C that are regularly distributed around the inner periphery of the pusher 153. The solid portion 153A presents an inside diameter $D_3$ less than the inside diameter $D_4$ of the hollow portion 153B, the connection tabs 153C between the portions 153A and 153B defining a cylindrical envelope having the same inside diameter $D_3$ as the solid portion 153A. In a variant, at least part of the cylindrical envelope defined by the tabs 153C may be of inside diameter equal to the inside diameter $D_4$ of the hollow portion 153B so as to reduce the friction exerted on the O-rings 134 and 154 during the transient stage of coupling the elements 103 and 105 together. As in the first embodiment, the tabs 153C extend substantially parallel to the axis X-X' and present a cross-section that is constant along their entire length.

In this embodiment, the front portion 135A of the female valve 135 has the same inside diameter $D_3$ as the solid portion 153A of the male pusher 153. Advantageously, the outside diameter d' of the O-rings 134 and 154 housed respectively in the grooves 133C and 155C is less than the inside diameter $D_4$ of the hollow portion 153B of the male pusher 153 and equal to or slightly greater than the inside diameter $D_3$ of the portions 135A and 153A.

The elements 103 and 105 of the coupling 101 are coupled together in a manner analogous to the first embodiment by engaging the male element 105 in the female element 103, thereby causing the valve in each of the elements to slide. In similar manner to the first embodiment, vents that are not shown may be provided to the rear of the hollow portion 153B of the male pusher 153 so as to limit the rise of pressure inside the coupling while the elements 103 and 105 are being coupled together.

In the coupled configuration as shown in FIG. 7, the O-ring 138 housed in the female body 131 provides sealing for the coupling between the elements 103 and 105 by co-operating in leaktight manner with the outer peripheral surface of the male pusher 153. The O-rings 134 and 154 are then protected from the main fluid flow V in the coupling 101 by the hollow portion 153B of the male pusher 153 that, as in the first embodiment, serves to provide the O-rings 134 and 154 with protection both radially and axially relative to the main flow V, while limiting the extent to which the O-rings 134 and 154 can move radially out from their respective receiver grooves 133C and 155C, thereby limiting any risk of the O-rings 134 and 154 being expelled from the grooves. The difference of the inside diameters $D_3$ and $D_4$ between firstly the hollow portion 153B and secondly the portions 153A and 135A serves to enable the O-rings 134 and 154 in the coupled configuration to be given an available radial thickness $e_4$ between the bottoms of the O-ring receiver grooves 133C and 155C and the inner peripheral surface of the hollow portion 153B that is greater than the radial thickness $e_3$ that is available in the uncoupled configuration of each of the elements 103 and 105, thus providing advantages that are similar to those of the first embodiment.

In the embodiment shown in FIG. 7, as in the first embodiment, the circuit opens before the O-rings 134 and 154 are protected by the hollow portion 153B of the male pusher 153, with expulsion of the O-rings 134 and 154 being prevented by the tabs 153C. The O-rings 134 and 154 are maximally confined since the coupling portion between the portions 153A and 153B as defined by the tabs 153C is of inside diameter equal to $D_3$. Nevertheless, the elements 103 and 105 may also be designed in such a manner that the fluid does not begin to flow through the coupling 101 while it is being coupled together until the O-rings 134 and 154 are protected, by providing an axial distance a' measured between the rear end of the groove 133C for receiving the O-ring 134 and the rear end 133B of the shutter portion of the female pusher 133, i.e. the portion of the pusher 133 that is suitable for co-operating with the inner peripheral surface of the solid portion 153A of the male pusher 153, that is greater than or equal to the axial distance b' measured between the solid and hollow portions 153A and 153B of the male pusher 153, i.e. between the zone where the tabs 153C connect with the solid portion 153A and the front end of the hollow portion 153B.

Figures 9, 10:
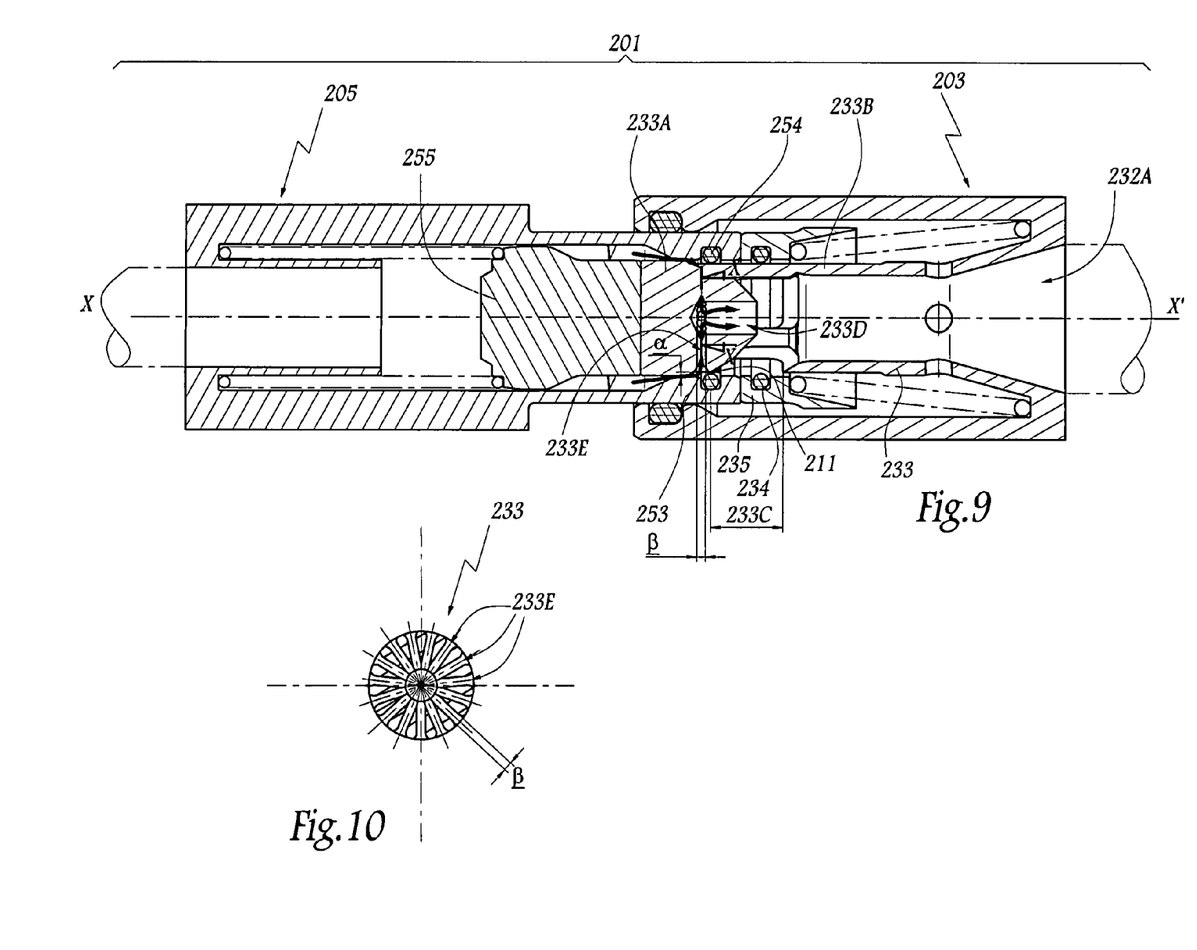
FIG. 9 is a section analogous to FIG. 1 for a coupling according to a third embodiment of the invention, while its male and female elements are being coupled together.
FIG. 10 is a section on line X-X of FIG. 9.

In the third embodiment shown in FIGS. 9 and 10, elements that are analogous to those of the first embodiment are given identical references plus 200. The coupling 201 according to this third embodiment comprises a female element 203 and a male element 205 designed to engage one in the other in the direction of a common longitudinal axis X-X'. The coupling elements 201 differ from the coupling elements 1 of the first embodiment in that the pusher 233 of the female element 203 has orifices that act, during the transient stage of coupling the elements of the coupling together, to divert a portion of the fluid flow away from the O-ring mounted on the pusher of the male element.

More precisely, in manner analogous to the first embodiment, the pusher 233 comprises a solid portion 233A and a hollow portion 233B that are connected together by three connection tabs 233C that are regularly distributed around the outer periphery of the pusher 233. The rear conical end of the solid portion 233A includes a central bore 233D that is connected to the main flow channel 232A defined by the pusher 233 for the purpose of passing the fluid. A front end of the bore 233D is connected to diversion orifices 233E pierced through the solid portion 233A between the front end of the solid portion 233A and the front ends of the connection tabs 233C.

As can be seen in FIG. 10, the pusher 233 has fifteen diversion orifices 233E that are regularly distributed over the section of the solid portion 233A, each orifice 233E being directed in a radial direction of the portion 233A so as to create an auxiliary flow passage for the fluid between the main channel 232A and the radial space that is defined during coupling of the elements of the coupling 201 between the pusher 233 of the female element 203 and the pusher 253 of the male element 205. In particular, each deflection orifice 233E opens radially into the outer peripheral surface of the pusher 233, at least partially in register with the groove for receiving the O-ring 254 that is carried by the pusher 253 of the male element 205 when said O-ring 254 reaches the connection tabs 233C. Thus, the orifices 233E are suitable for diverting a portion of the fluid flow when the O-ring 254 comes up to the connection tabs 233C.

Furthermore, as shown in FIG. 9, each diversion orifice 233E opens into a portion of the pusher 233 that presents an outside diameter equal to the outside diameter of the hollow portion 233B and to the outside diameter of the portion of the pusher 233 that is defined by the connection tabs 233C. Thus, the radial thickness available for the O-ring 254 in register with the diversion orifices 233E, as measured between the bottom of the groove for receiving the O-ring 254 and the outer peripheral surface of the pusher 233, is greater than the radial thickness available for the O-ring 254 when the elements of the coupling 201 are in the uncoupled configuration. Under such circumstances, friction stresses on the O-ring 254 against the edges of the diversion orifices 233E are limited while the elements of the coupling are being coupled together.

Each orifice 233E is designed with a cross-section β that is greater than the cross-section α of a radial fluid-passing gap 211 defined between the pusher 233 of the female element 203 and the pusher 253 of the male element 205 while the elements of the coupling 201 are being coupled together. More precisely, the radial gap 211 is a mean radial gap between the outer peripheral surface of the pusher 233 that is situated to the rear of the orifices 233E and the inner peripheral surface of the pusher 253 that is situated in register therewith. By way of example, in this embodiment, the section β of each diversion orifice 233E is substantially equal to twice the cross-section α of the radial gap 211. In addition, the section of the central bore 233D is dimensioned as a function of the number and the section of the diversion orifices 233E so as not to limit the flow of fluid from or to the orifices 233E. Thus, when the O-ring 254 carried by the pusher 153 of the male element 205 comes up to the connection tabs 233C, the flow of fluid in the coupling is channeled preferentially through the diversion orifices 233E and the central bore 233D of the solid portion 233A rather than through the radial gap 211. As a result, the flow of fluid coming into contact with the O-ring 254 is limited. Nevertheless, the section β of each diversion orifice 233E is selected to have a value that is relatively small so as to avoid weakening the pusher 233.

The presence of the diversion orifices 233E is particularly advantageous when a large internal pressure difference exists between the male element and the female element of a coupling in accordance with the invention, prior to the elements of the coupling being coupled together. In particular, when the internal pressure of the male element 205 is greater than the internal pressure of the female element 203, as shown in FIG. 9, the O-ring 254 is liable to become deformed by the flow of fluid and to be ejected from its reception groove in register with the connection tabs 233C. During coupling, when the O-ring 254 comes up to the connection tabs 233C that correspond to a larger fluid flow section, the flowing fluid, in the absence of the diversion orifices 233E and for a large internal pressure difference between the elements of the coupling, tends to press strongly against the O-ring 254, which is then liable to be damaged. In contrast, when diversion orifices 233E are provided, the flow of fluid is channeled preferentially away from the O-ring 254 through the diversion orifices 233E and the central bore 233D, thus enabling the flow in contact with the O-ring 254 to be limited, which O-ring is thus protected. The O-ring 234 carried by the valve 235 of the female element 203 is not subjected to such action by the flow in fluid since, when the O-ring 234 reaches the connection tabs 233C, the O-ring 254 is already providing the coupling 201 with sealing.

As can be seen from the three above-described embodiments of the invention, a coupling element and a coupling in accordance with the invention make it possible, while the elements of the coupling are being coupled together and when the coupling is in the coupled configuration, to guarantee good stability for the O-rings in their housings that provide the interface between the pushers and the valves. In addition, because of the appropriate shape of the part 333 or 153B that protects the O-rings, the radial thickness given to the O-rings in the coupled configuration of the coupling is sufficient to eliminate any risk of the O-rings being damaged by friction against the protection part.

Furthermore, the profiles of the connection tabs between the solid and hollow portions of the protection part, as obtained by milling, serves to limit any weakening of the O-rings as a result of the O-rings rubbing against the tabs while the elements of the coupling are being coupled together. The relatively small cross-section of these tabs contributes to reducing the amount of friction to which the O-rings are subjected by limiting the areas of contact between the O-rings and the tabs. Furthermore, as they move axially along the tabs, the O-rings tend to return to their rest shape at the flow orifices. However, since the tabs are of constant cross-section, the deformations to which the O-rings are subjected as they move along the tabs are small, thereby limiting the extent to which the O-rings are weakened.

The invention is not limited to the examples described and shown. In particular, a coupling in accordance with the invention need have only one of its two coupling elements that is provided with a valve for shutting the circuit. In addition, diversion orifices for diverting a fraction of the fluid flow away from the O-rings, analogous to the orifices 233E described for the third embodiment, could equally well be provided for the coupling 101 of the second embodiment. These diversion orifices would then be provided in the solid portion 153A of the pusher 153 of the male element 105 between the front end of the solid portion 153A and the connection tabs 153C, so as to open out radially in the inner peripheral surface of the solid portion 153A. Such diversion orifices thus act, as in the third embodiment, to create an auxiliary flow passage for the fluid flow from or to the inside volume 152 of the male body 151. Whatever the embodiment, the number of diversion orifices in the pusher 233 or 153 may likewise be different from the number of orifices 233E described for the third embodiment. In particular, it is advantageous to provide the above-mentioned pusher with at least one diversion orifice.

In a variant of the invention that is not shown, the parts that are pushed back during coupling of the elements of a coupling in accordance with the invention may also present different diameters, unlike the two above-described embodiments where the pushers and the valves that bear against one another during coupling of the male and female elements are designed to have diameters that are equal. For example, in the first embodiment, the outside diameter of the front portion 551 of the male valve 55 may be greater than the outside diameter of the front portion 331 of the female pusher 33, with the positions of the O-rings 34 and 54 being adapted so as to guarantee that the coupling is sealed while coupling is taking place.

In addition, in another variant of the invention that is not shown, the interface O-rings between the pushers and the valves may differ from one coupling element to the other. In particular, these interface O-rings may be provided with inside diameters and/or toroidal diameters that differ from one coupling element to the other, with the operating clearance between the pusher and the valve of one coupling element not necessarily being identical to that of the other element. Thus, in a variant of the invention that is not shown, the diameters d or d' of the interface O-rings, and also the radial thicknesses $e_1$, $e_2$, or $e_3$, $e_4$ available for the interface O-rings may be different for the interface O-ring of a first coupling element and for the interface O-ring of the second element, while guaranteeing a reduction in the forces exerted by the fluid on the interface O-rings and guaranteeing that the O-rings are confined in their receiver grooves while the elements of the coupling are being coupled together and when the coupling is in its coupled configuration.

Furthermore, the number of connection tabs between the solid and hollow portions of the O-ring protection part may be other than three. Nevertheless, a good compromise between keeping the O-rings in their housings during coupling of the coupling elements and minimizing disturbance to fluid flow, in particular at a high flow rate, is advantageously achieved when using three connection tabs. The coupling elements may also have sections other than circular.

Finally, the fluid is shown in the figures as flowing from the female element towards the male element of the coupling. Nevertheless, fluid flow through a coupling in accordance with the invention may take place equally well in one direction or in the opposite direction.

The invention claimed is:

1. A female or male coupling element for a coupling for releasably connecting together pipes conveying a fluid under pressure, said female or male element being suitable for being coupled with a corresponding male or female coupling element, said female or male element including a pusher and a shutter valve suitable for sliding axially relative to the pusher during coupling of said element, said female or male element further including at least one sealing O-ring received in a peripheral groove of a first part selected from the pusher and the valve and suitable for co-operating in leak tight manner with a first portion of a second part selected from the pusher and the valve in the uncoupled configuration of said element, whereas, in the coupled configuration of said element, a protection part for protecting the O-ring and forming a portion of said element is radially interposed between the O-ring and a main fluid flow in said element, the protection part being a second portion of the second part, the first and second portions of the second part having radial dimensions that are different, and the radial thickness available for the O-ring in the coupled configuration of said element being greater than the radial thickness available for the O-ring in the uncoupled configuration of said element, the first and second portions of the second part being connected to each other by connection tabs, wherein each connection tab is of cross-section that is constant along its entire length.

2. A coupling element according to claim 1, wherein a diameter of the O-ring housed in a peripheral groove of the part on which it is mounted, and a diameter of the protection part are such that the O-ring is not in contact with the protection part in the coupled configuration of said element.

3. A coupling element according to claim 1, wherein the portion of the second part defined by the connection tabs is at least partially of radial dimensions that are equal to those of the second portion.

4. A coupling element according to claim 1, wherein the second part has three connection tabs regularly distributed around the periphery of the second part.

5. A coupling element according to claim 1, wherein the O-ring is received in an inner peripheral groove of the valve and co-operates in leak tight manner with an outer peripheral surface of a solid portion of the pusher in the uncoupled configuration of said element, the protection part being a hollow portion of the pusher, the solid and hollow portions of the pusher being connected together by the connection tabs, the solid portion being of radial dimensions greater than the radial dimensions of the hollow portion.

6. A coupling element according to claim 1, wherein the second part includes, in said first portion, at least one orifice opening out radially in a position that lies, along the longitudinal axis of said element between the front end of the second part and the front end of the connection tabs.

7. A coupling element according to claim 6, wherein each orifice of the second part opens out in a portion of the second part that is of radial dimensions equal to the radial dimensions of the second portion of the second part.

8. A coupling element according to claim 6, wherein each orifice of the second part has a cross-section greater than the cross-section of a radial gap defined between the second part and a part adjacent to the second part during coupling of said element with a corresponding coupling element.

9. A coupling element according to claim 1, wherein the coupling element includes another sealing O-ring that is stationary relative to a body of said element and that is designed to provide sealing for the coupling obtained by coupling said element with a corresponding coupling element.

10. A coupling element according to claim 1, wherein a front face of the element defined by front faces of the pusher and of the valve in the uncoupled configuration of the element is substantially plane.

11. A coupling for releasably joining pipes conveying a fluid under pressure, the coupling comprising a female element and a male element suitable for being coupled together, wherein a first element of the coupling elements is an element in accordance with claim 1.

12. A coupling according to claim 11, wherein a second element of the coupling includes a pusher and a shutter valve suitable for sliding axially relative to the pusher for coupling the two elements of the coupling together, the second element further including at least one sealing O-ring mounted on one part selected from the pusher and the valve of the second element and suitable for providing sealing between the pusher and the valve in the uncoupled configuration of the second element, the protection part of the first element being interposed radially in the coupled configuration of the coupling between the O-ring of the second element and a main fluid flow in the coupling, the radial thickness available for the O-ring of the second element in the coupled configuration of the coupling being greater than the radial thickness available for the O-ring of the second element in the uncoupled configuration of the second element.

13. A coupling according to claim 12, wherein the pusher of the first element is suitable for co-operating with the valve of the second element, and the pusher of the second element is suitable for co-operating with the valve of the first element for coupling together the two elements of the coupling.

14. A coupling according to claim 12, wherein the axial distance between a rear end of a groove for receiving the O-ring of the second element and a rear end of a shutter portion of the part of the second element on which the O-ring is mounted is greater than or equal to the axial distance between the first and second portions of the part of the first element forming the protection part.

* * * * *